(12) United States Patent
Tammisetti et al.

(10) Patent No.: US 12,732,803 B1
(45) Date of Patent: Sep. 8, 2026

(54) NETWORK ENGINEERED ARCHITECTURE FOR FOCUSED AUTOMATED NETWORKS

(71) Applicant: Spectredge Wireless Inc., Chantilly, VA (US)

(72) Inventors: Mohan Tammisetti, Chantilly, VA (US); David V. Aguilar, Chantilly, VA (US)

(73) Assignee: SPECTREDGE WIRELESS INC., Chantilly, VA (US)

( * ) Notice: Subject to any disclaimer, the term of this patent is extended or adjusted under 35 U.S.C. 154(b) by 0 days.

(21) Appl. No.: 18/420,271

(22) Filed: Jan. 23, 2024

Related U.S. Application Data

(60) Provisional application No. 63/440,608, filed on Jan. 23, 2023.

(51) Int. Cl.
*H04L 29/06* (2006.01)
*H04W 12/033* (2021.01)
*H04W 12/06* (2021.01)

(52) U.S. Cl.
CPC ......... *H04W 12/033* (2021.01); *H04W 12/06* (2013.01)

(58) Field of Classification Search
CPC ............................ H04W 12/033; H04W 12/06
See application file for complete search history.

(56) References Cited

U.S. PATENT DOCUMENTS

2012/0320892 A1* 12/2012 Moeller ................ H04W 4/029 370/328
2015/0347839 A1* 12/2015 Hagen ................ G06K 7/10009 382/187
2018/0199218 A1* 7/2018 Ashrafi ................. H04W 24/02
2020/0145432 A1* 5/2020 Verma ................... H04W 12/08
2020/0205019 A1* 6/2020 Guha .................... H04L 67/303
2022/0061059 A1* 2/2022 Dunsmore ............ H04L 9/0897
2024/0205207 A1* 6/2024 Kasody ............... H04L 63/0823

* cited by examiner

*Primary Examiner* — Ka Shan Choy
(74) *Attorney, Agent, or Firm* — HAYES SOLOWAY P.C.

(57) ABSTRACT

A layered secure private edge high-speed network architecture apparatus comprising an integrated local area network (LAN) and wide area network (WAN) interface, including a router-switch board and memory for storing software and applications. A central processing unit (CPU) is configured for software execution and to drive apparatus components, wherein at least one satellite receiver and at least one radio transceiver is configured to accept and send signals. A control unit (CU) is utilized to direct operations, and wherein at least one protocol data unit (PDU) is employed for communicating network addresses; and a transmitting antenna system is configured to provide a layered secure edge network signal to a user.

19 Claims, 6 Drawing Sheets

Web based Graphical Interface

NETWORK ENGINEERED ARCHITECTURE FOR FOCUSED AUTOMATED NETWORKS

CROSS REFERENCE TO RELATED APPLICATION

This application claims benefit of U.S. Provisional Application Ser. No. 63/440,608, entitled, "Extreme edge network engineering architecture created for Edge focused automated Networks" filed Jan. 23, 2023, the entire disclosure of which is incorporated herein by reference.

FIELD OF THE DISCLOSURE

The present disclosure is generally related to providing a layered secure private edge network architecture to a remote user, and more particularly is related to providing a highly secure integrated remote network access to a user in order to send and receive communications and connect to the Internet for a user outside of a standard network range domain.

BACKGROUND OF THE DISCLOSURE

Many individuals utilize cellular networks or wireless signals to obtain a connection to the Internet, as a means to communicate with others or to send data. Due to the rising use of cellular networks and devices requiring network access, providing Internet and communication access to users outside of standard tower locations and in remote areas can prove difficult. Over time, the signals have become faster and more reliable; however, a user typically needs to be within a populated area to obtain a decent signal for performing the necessary communications or have an Internet connection.

FIG. 1 is a diagram illustrating a standard 5G transmission layered network which depicts the different layered requirements for providing a signal to an end user. In general terms, a standard 5G transmission layered network includes a radio frequency or physical network which is connected by a fronthaul and backhaul layer to the 5G centralized and/or distributed units, where this 5G core network is connected through the fronthaul and backhaul layers to a 5G-enabled network, such as the Internet. The backhaul component of a typical network links the mobile network to a wired network and the fronthaul component is used to connect the remote cell sites to the centralized base band units. The use of fronthaul and backhaul operations slows the network connection considerably.

With this in mind, it is difficult to provide access to a secure high speed reliable network to users in obscure areas. If a signal is available, it is most likely poor and it can cause significant delays in transmitting, switching, and processing data. Further, security on most platforms can make it difficult for those to transmit secure, confidential and/or sensitive data that is important to have transmitted quickly. Most mobile networks also require a backhaul or the ability to connect multiple different broadband sites to increase the network coverage area and assist with carrying data from smaller networks to larger ones. Moreover, backhaul can face challenges in capacity, latency, flexibility, and cost. Many network applications that have the potential of generating large amounts of data are not feasible to transport over backhaul networks.

Thus, a heretofore unaddressed need exists in the industry to address the aforementioned deficiencies and inadequacies.

SUMMARY OF THE DISCLOSURE

Embodiments of the present disclosure provide a system and method for providing network access to a user outside of a standard networking system. Briefly described, in architecture, one embodiment of the system, among others, can be implemented as follows. The layered secure private edge high-speed network architecture apparatus has an integrated local area network (LAN) and wide area network (WAN) interface, wherein there is a router-switch board, and memory for storing software and applications. At least one central processing unit (CPU) executes software and drives apparatus components within the apparatus. At least one satellite receiver and at least one radio transceiver are configured to accept and send signals, and a control unit (CU) is utilized to direct operations, while at least one protocol data unit (PDU) is configured for communicating network addresses. A transmitting antenna system is configured to provide a layered secure edge network signal to a user. The LAN and WAN interface links are utilized to connect to application servers, the internet and private networks, wherein the router-switch board is configured to provide secure signal transmissions, and the radio transceiver comprises an access and mobility management function, a session management function, a user plane function, and a network repository function. A multi-access edge computing (MEC) server is configured to process and store data, with an object access module (OAM) interface for transmitting signals to and from a software programmable and hardware adaptable engine, and further comprises a core network module configured to provide the engine with an interface. The engine may be a search engine or an artificial intelligence driven engine. A router-switch board provides network security between the aforementioned MEC server and the engine. Additionally, a CPU may be configured for access and mobility management function (AMF), session management function (SMF), and user plane function (UPF).

The present disclosure can also be viewed as providing methods of providing a layered secure private edge network architecture. In this regard, one embodiment of such a method, among others, can be broadly summarized by the following steps: integrating local area network (LAN) and wide area network (WAN) interface links; configuring a router-switch board for secure transmission of signals; storing software and applications; configuring a central processing unit to execute software and drive apparatus components; configuring a control unit to control and direct operations; employing a protocol data unit to communicate network addresses; transmitting and receiving signals, communication, and data via a radio transmitter; and providing a network signal to a user via an antenna system. Further, the LAN and WAN interface links can be utilized to connect to application servers, internet and private networks, wherein the router-switch board is configured to provide secure signal transmissions, and the signals provide an access and mobility management function, a session management function, a user plane function, and a network repository function. A multi-access edge computing (MEC) server is used to process and store data, wherein an object access module (OAM) interface is utilized for transmitting signals to and from a software programmable and hardware adaptable engine. The engine may be a search engine or an Artificial Intelligence (AI) engine. Further, a core network module may be configured to provide said engine an interface. The router-switch board is configured to provide network security between the MEC server and the engine, wherein the computer processing unit (CPU) is configured for access and mobility management function (AMF), session management function (SMF), and user plane function (UPF) to execute the software and drive apparatus components.

The present disclosure can also be viewed as providing a system for layered secure private edge high-speed network architecture. Briefly described, in architecture, one embodiment of the system, among others, can be implemented as follows. The system comprises at least one layered secure private edge network architecture apparatus which is configured to connect to a signal with a connection to an integrated local area network (LAN) or wide area network (WAN) to link said apparatus to internet, private networks and servers employing a router-switch board providing a secure private connection to said apparatus, and a central processing unit (CPU) for executing software stored in a memory within said apparatus. At least one satellite receiver and at least one radio transceiver is configured to accept and send signals. At least one control unit (CU) is utilized for directing operations with the apparatus along with at least one protocol data unit (PDU) for communicating network addresses, and a transmitting antenna system is configured to provide a layered secure edge network signal to a user and a web-based interface is utilized to configure said layered secure private edge network and the apparatus is configured to provide a repeated signal to remote locations. Additionally, the layered secure private edge network architecture apparatus may be mobile.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
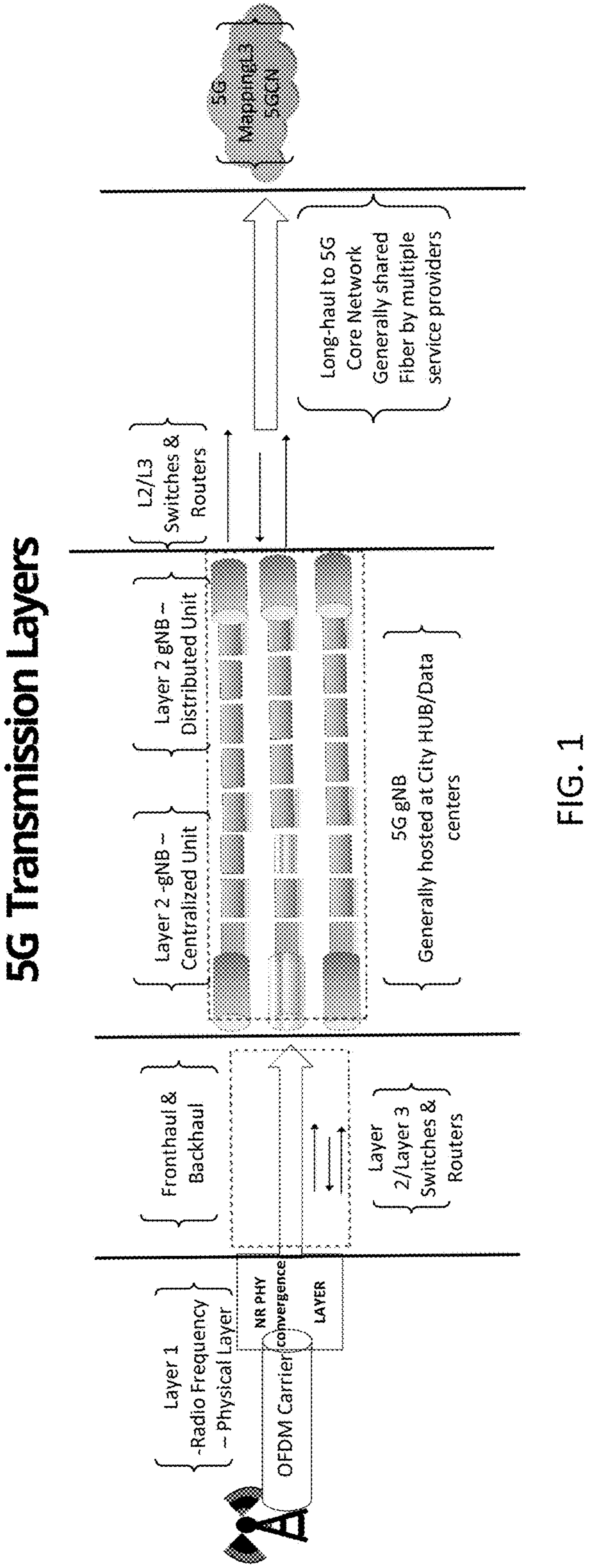
FIG. 1 is a diagram illustrating a standard 5G transmission layered network in accordance with the prior art.
Figure 2:
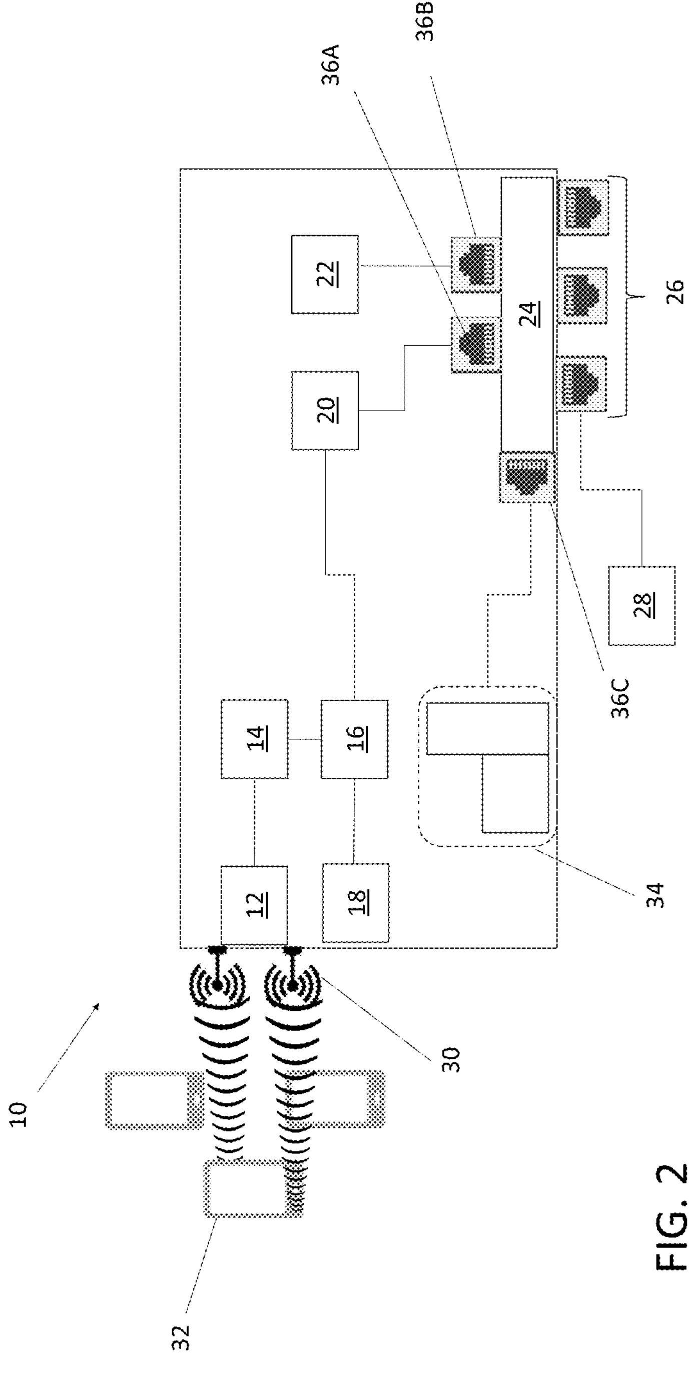
FIG. 2 is a diagram illustrating the apparatus in accordance with exemplary embodiments of the present disclosure.

To improve over the shortcomings described in the Background, this disclosure is directed to a layered, secure, private-edge, high-speed network architecture to a user. FIG. 2 is a diagram illustrating the layered, secure, private-edge, high-speed network architecture apparatus 10 in accordance with a first exemplary embodiment of the present disclosure. The layered, secure, private-edge, high-speed network architecture apparatus 10, which may be referred to herein simply as apparatus 10, includes local area and wide area network (LAN and WAN) ethernet ports 26, and the apparatus 10 can be connected to a server 28 or another computing device to upload, download, or otherwise communicate any software, and/or to provide apparatus 10 with data and/or private network connections. The LAN and WAN ethernet ports 26 are part of the integrated router-switch board 24 where connectivity is established within the apparatus 10 to the system components via ethernet ports 36A, 36B. The router-switch board 24 also provides apparatus 10 with security protocols. Ethernet ports 36A, 36B establish connections between the router-switch board 24 and a central processing unit 20 and an internal multi-access edge computing application server (MEC) 22.

Central processing unit 20 may include any type of electronic data processing device which is configured to execute software and drive apparatus 10 components, while the MEC server 22 may be an optional component utilized to store customized applications that can be utilized when deploying the secure network. Additionally, an optional connection to an engine 34 via ethernet port 36C can be utilized to provide Internet search functionality including but not limited to artificial intelligence (AI) engines and search engines, as will be discussed in further detail. Hardware components for AI implementation can be included within apparatus 10. These components can be implemented via the router-switch board 24 as shown in engine 34. An AI platform and carrier board can be included to support AI functionality and can be utilized while deploying the network. The central processing unit 20 communicates with a protocol data unit 18 which provides internet protocol information to the apparatus 10 for obtaining networking addressing information. The protocol data unit 18 is connected to a control unit 16. Control unit 16 directs the operation of central processing unit 20 within apparatus 10. The control unit 16 is also connected to a radio transceiver 14 which accepts and disburses signals within the apparatus 10. A satellite receiver 12 is integrated and configured to transmit the signals from the antenna system 30 which is configured to provide the layered edge network to an end user's device 32.

Figure 3:
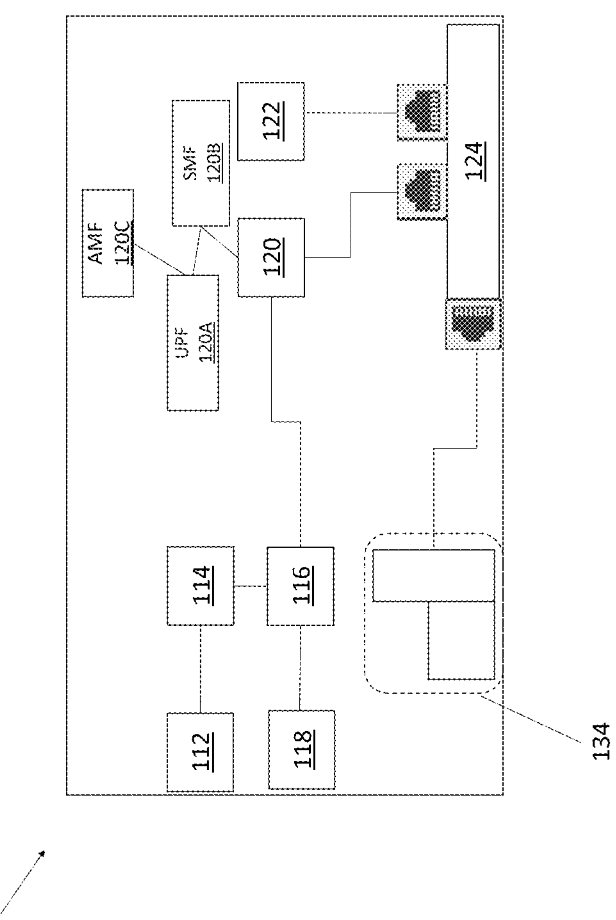
FIG. 3 is a diagram illustrating techniques for providing a secure network using the layered, secure, private-edge, high-speed network architecture apparatus, in accordance with exemplary embodiments of the present disclosure.

FIG. 3 is a diagram illustrating techniques for providing a secure network using the layered, secure, private-edge, high-speed network architecture apparatus, in accordance with exemplary embodiments of the present disclosure. In particular, diagram 100 of FIG. 3 illustrates a method of employing and providing the software foundation to the hardware architecture as described in FIG. 2 of apparatus 10. Diagram 100 provides a flowchart of the software architecture and method for driving the apparatus 10, and thus, overlaps with components described relative to FIG. 2. As can be seen, router-switch board 124 provides data to one or more optional engines 134. Engines 134, e.g., AI engines or search engines can be modules, applications, and/or hardware components which perform specific functionality during use of the apparatus 10. For instance, one or more of the engines 134 may be in the form of Internet searching functions and/or AI engines. Similarly, as with reference to FIG. 2, AI components may be included via the router-switch board 124 at location 134. Router-switch board 124 provides access to optional applications and optional MEC servers 122, and the central processing unit takes instructions from a program or application and performs calculations to drive the system architecture 120. This may include, for example, an access and mobility management function (AMF) 120C, a session management function (SMF) 120B, and a user plan function (UPF) 120A, all of which may be responsible for managing access and mobility for devices within the network. The underlying method driving the appropriate control unit and data unit driven control unit 116 and protocol data unit 118 interfaces for integration with radio units and/or transceiver 14, and other components of apparatus 10. With the same architecture, radio transmitter receives and sends signals, communications and data 114 and satellite transceiver software 112 is driven in apparatus 10 and is configured to descramble encrypted signals.

It should be noted that any process descriptions or blocks in flow charts should be understood as representing modules, segments, portions of code, or steps that include one or more instructions for implementing specific logical functions in the process, and alternate implementations are included within the scope of the present disclosure in which functions may be executed out of order from that shown or discussed, including substantially concurrently or in reverse order, depending on the functionality involved, as would be understood by those reasonably skilled in the art of the present disclosure.

Figure 4:
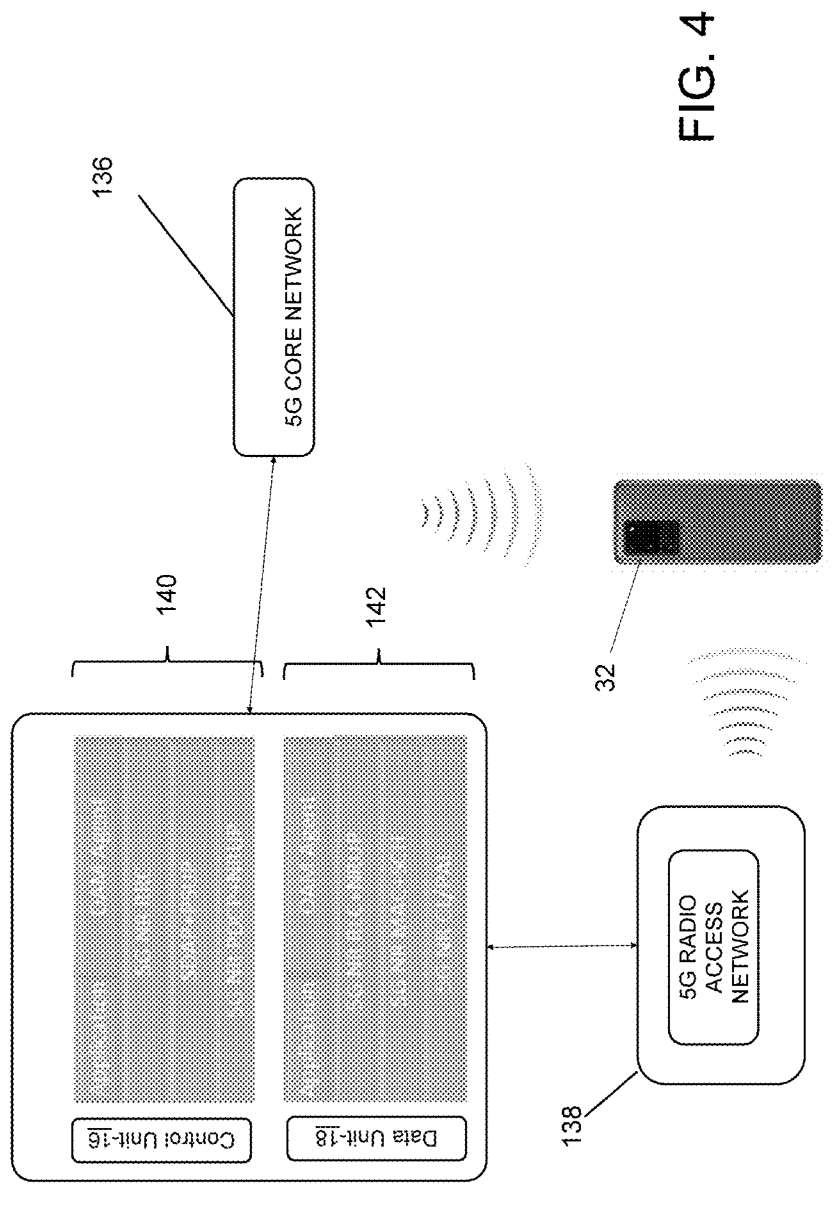
FIG. 4 is a flowchart illustrating the system of providing a networking signal to an end user, in accordance with exemplary embodiments of the present disclosure.

FIG. 4 is a flowchart illustrating the system of providing a networking signal to a device 32, in accordance with further exemplary embodiments of the present disclosure. In particular, FIG. 4 illustrates the functional roles of the protocol data unit 18 and control unit 16 within the apparatus 10 described relative to FIG. 2. As depicted, control unit 16 utilizes applications to fetch instructional data from the central processing unit 20 and translates the instructional data to control signals. 5G communication, which is provided in layers, may be supported by the protocol data unit 18 and control unit 16. The protocol data unit 18 provides support for the lower layers of the protocol indicated at portion 142 and the control unit 16 supports the higher layers. Additionally, the protocol data unit 18 may be responsible for performing all arithmetic and logical operations on the data within the network. In this regard, within control unit 16 at portion 142, an operational, administration and management (OAM) agent may provide the processes, activities, tools, and standards when administering, operating and managing the system.

It can further be seen in FIG. 4 that the 5G layered infrastructure is provided within control unit 16. A 5G radio resource control and base network layer may be provided along with a service data protocol for mapping and may be utilized to control the quality of service provided to a device 32. Further, service data adaptation protocol (SDAP), session user plane protocol (PSUP) may be administered via control unit 16 to drive correct address assignments. Packet data convergence protocol (PDCP) and NR user plan protocol layers may also be administered herein to authenticate users and subscribers within the network. These are the higher layers of the 5G network system. Additionally, the protocol data unit 18 utilizes programmable applications to communicate network addresses and assist with data transfer, security and to assist with offloading network and communication workload from the processing unit 20. Additionally, as shown in FIG. 4, the 5G radio access network 138 provides a specific type of access to the instant secure system wirelessly and between the device 32 and the core network 136.

Figure 5:
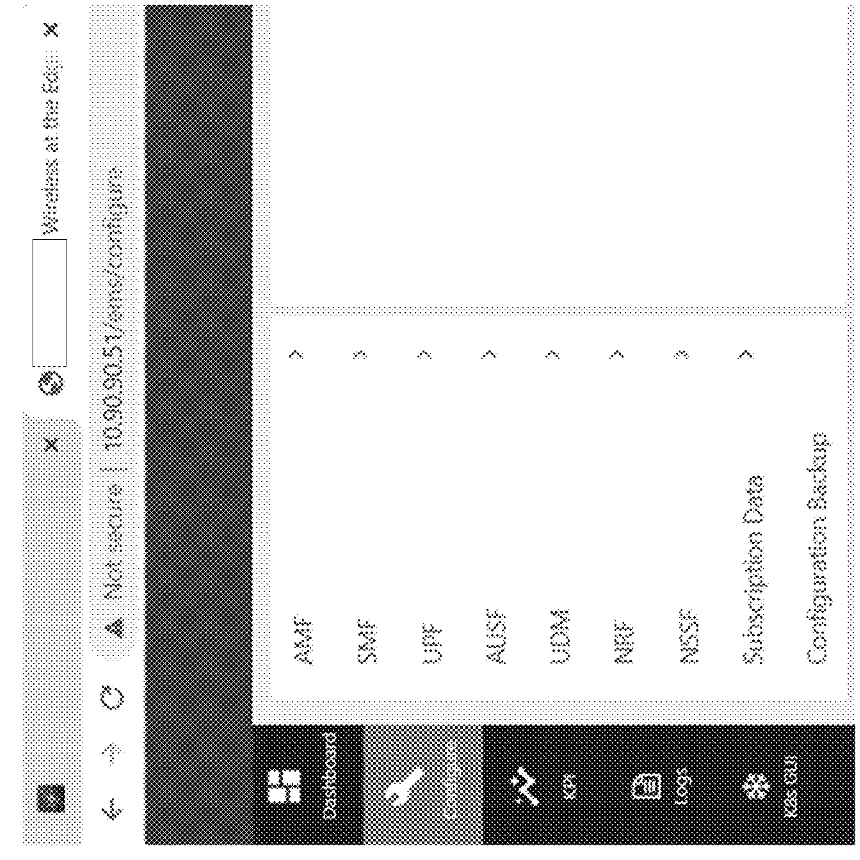
FIG. 5 is an image of the web based graphical interface in accordance with exemplary embodiments of the present disclosure.

FIG. 5 is an image of the web based graphical interface in accordance with a further exemplary embodiment of the present disclosure. A web-based application graphical interface operating system is employed for configuring the secure private edge high-speed network and manages access and mobility functions, session management functions and user plane functions, including the ability to monitor performance indicators for the network. Within the graphical interface, the user can interact with the software running within apparatus 10 and configure necessary elements and software components. A dashboard provides several integrated features including, but not limited to, network key performance indicators (KPI), where benchmarks are tracked for optimal performance of the network. The interface can provide logs for tracking users and access to objects and authentication attempts. Logs can also be an important source of issues related to network functionality. The dashboard can also be equipped with Kubernetes (K8) for open source deployments, scales and management of applications utilized anywhere with the network.

Figure 6:
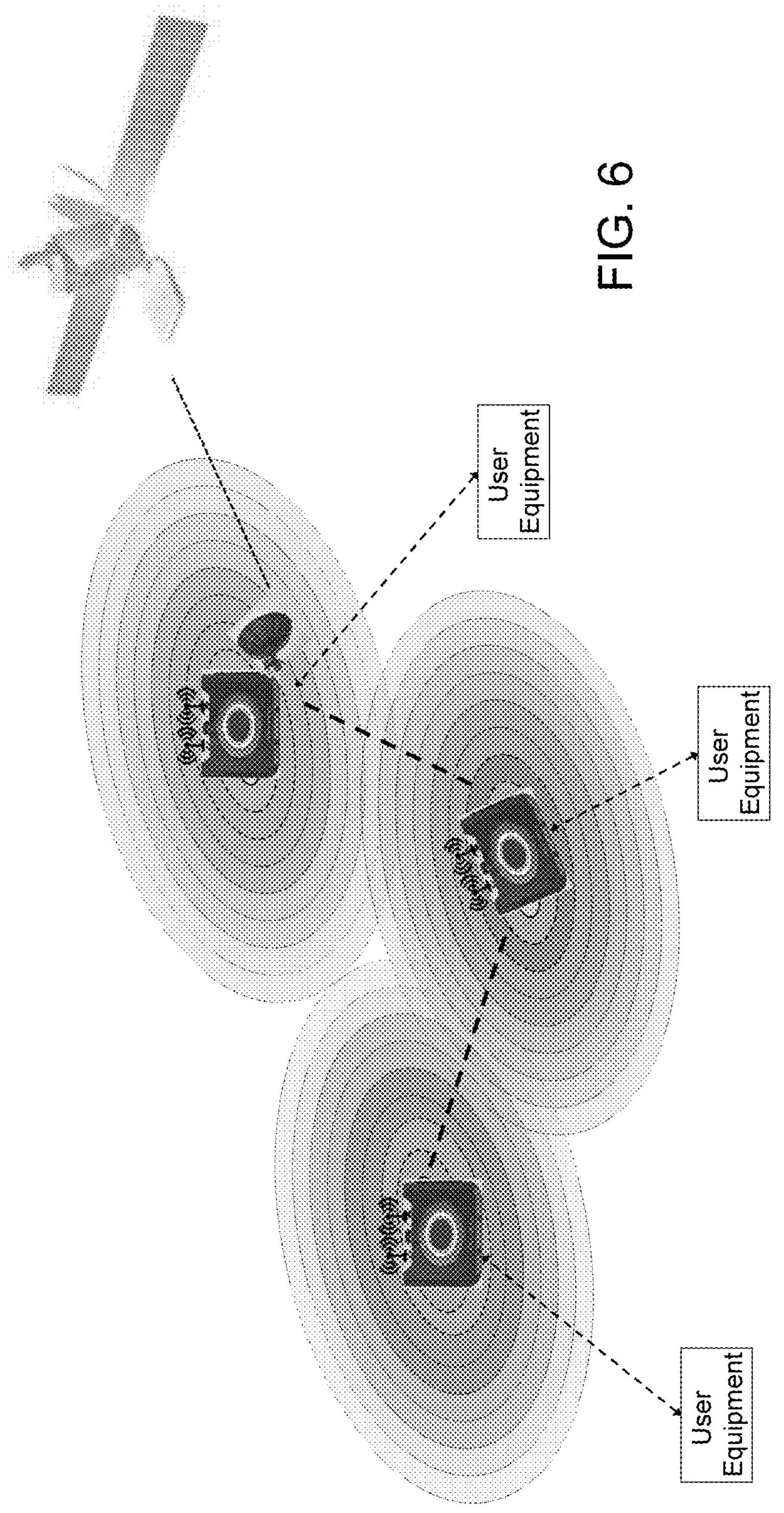
FIG. 6 is a diagram illustrating the repeater system of the apparatus in accordance with exemplary embodiments of the present disclosure.

FIG. 6 is a diagram illustrating the repeater system of the apparatus in accordance with an exemplary embodiment of the present disclosure. Apparatus 10 can be linked to multiple apparatuses to repeat signals to multiple users and/or provide network access to locations that would not have any connectivity in remote locations. These repeater systems can be used in military, commercial and/or first responder situations where communication is vital; however, may not be available and/or secure. For example, if military personnel are positioned at a location 1, and more military personnel are in the field at a location 2 which is remote from location 1, this linkage feature can provide a communications network between the two groups of personnel, to their respective base units and could also be helpful in the field when requiring data or coordinates. Within this infrastructure, secure data, communications, and coordinates can be communicated with the groups without having a third party obtain the information, and without conventional communication systems.

A further example could deploy apparatus 10 while attached to a drone and flown to remote areas, within a vehicle or a boat/ship that can access areas where the apparatus 10 could not be transported by foot. With this scenario, apparatus 10 could be utilized in the field, for common operating platform and continuation of operations, airborne uses, communications on the move, executive communication support and/or public safety.

With use of this communication system via apparatus 10, providing a secure isolated cellular multi-domain network with no backhaul can be vital for many circumstances. Another example could include first responders to receive communications without others being included to cause unnecessary interruptions or public onlookers. Other uses can include but are not limited to manufacturing facilities, transportation services, precision farming, office buildings, multi-tenant office buildings, financial markets, financial market management and networks, private school and university campus networks, diplomatic missions, and the Department of Defense (DoD).

It should be emphasized that the above-described embodiments of the present disclosure, particularly, any "preferred" embodiments, are merely possible examples of implementations, merely set forth for a clear understanding of the principles of the disclosure. Many variations and modifications may be made to the above-described embodiment(s) of the disclosure without departing substantially from the spirit and principles of the disclosure. All such modifications and variations are intended to be included herein within the scope of this disclosure and the present disclosure and protected by the following claims.

What is claimed is:

1. A layered secure private edge high-speed network architecture apparatus comprising:

an integrated local area network (LAN) and wide area network (WAN) interface;

a router-switch board;

memory for storing software and applications;

at least one central processing unit (CPU) configured to execute instructions of the software and applications stored on the memory, wherein the CPU drives apparatus components;

at least one satellite receiver;

at least one radio transceiver configured to accept and send $5^{th}$ generation mobile network (5G) communication signals;

at least one control unit (CU), wherein the CU fetches instructional data from the CPU, and translates the instructional data into control signals, wherein the control signals direct operation of the CPU and perform 5G communication through the at least one satellite receiver and at least one radio transceiver;

at least one protocol data unit (PDU) in communication with the CU, wherein the CU is connected between the PDU and the CPU, and wherein the 5G communication separated into a first group of layers having network addresses with at least three 5G communication layers of data, wherein the at least three 5G communication layers of data are transmitted by the PDU and through the CU to the CPU, and a second group of layers having control layers transmitted from the CU to the CPU;

a transmitting antenna system connected to the satellite receiver and comprising radiating elements, wherein a layered secure edge network signal is transmitted to a user.

2. The apparatus of claim 1, wherein the LAN and WAN interface links are connected to application servers, the Internet and private networks.

3. The apparatus of claim 1, wherein the router-switch board is configured to provide secure signal transmissions.

4. The apparatus of claim 1, wherein the radio transceiver comprises an access and mobility management function, a session management function, a user plane function, and a network repository function.

5. The apparatus of claim 1, further comprising a multi-access edge computing (MEC) server comprising a platform, wherein the platform is configured to store customized applications to process and store data.

6. The apparatus of claim 5, wherein an object access module (OAM) interface within the CU and the PDU transmits signals to and from a software programmable and hardware adaptable engine, and further comprises a core network module, wherein an interface is provided to the engine with the core network module.

7. The apparatus of claim 5, wherein the router-switch board is configured to provide network security between the MEC server and the engine.

8. The apparatus of claim 1, wherein the CPU is configured for access and mobility management function (AMF), session management function (SMF), and user plane function (UPF).

9. A method for providing a layered secure private edge network architecture comprising the steps of:

integrating local area network (LAN) and wide area network (WAN) interface links;

configuring a router-switch board;

storing software and applications in the memory;

configuring a central processing unit (CPU) to execute instructions of the software and applications stored on the memory to drive apparatus components;

configuring a control unit (CU) to fetch instructional data from the CPU and translate the instructional data into control signals, wherein the control signals direct operation of the CPU and perform $5^{th}$ generation mobile network (5G) communication through at least one portable wireless satellite receiver and a radio transceiver to accept and send 5G communication signals;

employing a protocol data unit (PDU) in communication with the CU, wherein the CU is connected between the PDU and the CPU, and wherein the 5G communication separated into a first group of layers having network addresses with at least three 5G communication layers of data, and a second group of layers having control layers, wherein the first group of layers having at least three 5G communication layers of data are transmitted by the PDU and through the CU to the CPU, and the second group of layers having the control layers transmitted from the CU to the CPU;

transmitting and receiving the 5G communication signals via a radio transmitter; and providing the 5G communication signals to a user in a layered secure edge network via an antenna system connected to the satellite receiver.

10. The method of claim 9, wherein the LAN and WAN interface links are utilized to connect to application servers, internet and private networks.

11. The method of claim 9, wherein the router-switch board is configured to provide secure signal transmissions.

12. The method of claim 9, wherein the signals provide an access and mobility management function, a session management function, a user plane function, and a network repository function.

13. The method of claim 9, wherein a multi-access edge computing (MEC) server is configured to process and store data.

14. The method of claim 9, wherein an object access module (OAM) within the CU and the PDU interface transmits signals to and from a software programmable and hardware adaptable engine, and further comprises a core network module configured to provide the engine an interface.

15. The method of claim 14, wherein the router-switch board is configured to provide network security between the MEC server and the engine.

16. The method of claim 9, wherein a computer processing unit (CPU) is configured for access and mobility management function (AMF), session management function (SMF), and user plane function (UPF) executes the software and drive apparatus components.

17. The apparatus of claim 1, wherein a web-based interface is configured to access the layered secure edge network signal.

18. The apparatus of claim 1, wherein the apparatus is configured to provide a repeated signal to remote locations.

19. The apparatus of claim 1, wherein the layered secure private edge high-speed network architecture apparatus is transported by foot.

* * * * *